(12) United States Patent
Leirer et al.

(10) Patent No.: US 11,598,667 B2
(45) Date of Patent: Mar. 7, 2023

(54) COMPACT MULTI-BAND OPTICAL MEASURING UNIT

(71) Applicant: OSRAM OLED GmbH, Regensburg (DE)

(72) Inventors: Christian Leirer, Friedberg (DE); Christian Mueller, Deuerling (DE); Ulrich Steegmüller, Regensburg (DE)

(73) Assignee: OSRAM OLED GMBH, Regensburg (DE)

( * ) Notice: Subject to any disclaimer, the term of this patent is extended or adjusted under 35 U.S.C. 154(b) by 112 days.

(21) Appl. No.: 17/277,993

(22) PCT Filed: Sep. 18, 2019

(86) PCT No.: PCT/EP2019/075040
§ 371 (c)(1),
(2) Date: Mar. 19, 2021

(87) PCT Pub. No.: WO2020/058346
PCT Pub. Date: Mar. 26, 2020

(65) Prior Publication Data
US 2021/0348967 A1  Nov. 11, 2021

(30) Foreign Application Priority Data

Sep. 19, 2018  (DE) .......................... 102018123037.0

(51) Int. Cl.
*G01J 3/02* (2006.01)
*G01J 3/10* (2006.01)
(Continued)

(52) U.S. Cl.
CPC .............. *G01J 3/0256* (2013.01); *G01J 3/10* (2013.01); *G01J 3/2803* (2013.01); *G01J 3/42* (2013.01);
(Continued)

(58) Field of Classification Search
CPC ......... G01J 2003/2806; G01J 2003/425; G01J 3/0213; G01J 3/0256; G01J 3/0272;
(Continued)

(56) References Cited

U.S. PATENT DOCUMENTS

2011/0057227 A1* 3/2011 Oberleithner ......... H01L 33/504
257/E33.061
2015/0241347 A1* 8/2015 Emadi .................. A61B 5/4845
250/338.5
(Continued)

FOREIGN PATENT DOCUMENTS

WO  2017060746 A1  4/2017
WO  2017217801 A1  12/2017

OTHER PUBLICATIONS

Van Itallie ("Why the blue LED should light up your life (and won a Nobel Prize)", https://sitn.hms.harvard.edu/flash/2014/why-the-blue-led-should-light-up-your-life-and-won-a-nobel-prize/, Nov. 14, 2014 (Year: 2014).*

*Primary Examiner* — Hina F Ayub
(74) *Attorney, Agent, or Firm* — Slater Matsil, LLP

(57) ABSTRACT

In an embodiment a measuring unit includes a light emitting LED component including a housing occupying a housing surface G and an LED chip located within the housing, the LED chip including a light emitting light surface L and being configured to emit light; a photodetector configured to detect reflected light reflected from a measured object originating from the LED component and output a measurement signal dependent on a detection of the reflected light; and an integrated circuit configured to evaluate the measurement signal, wherein the LED component, the photodetector, and the integrated circuit are combined into an integrated unit; and a conversion layer disposed in the housing and located above the LED chip, the conversion layer configured to convert the light into multiband light, wherein a ratio L/G of
(Continued)

is greater than or equal to 0.8, and wherein the measuring unit is configured to optically measure at least one property of the measured object.

12 Claims, 1 Drawing Sheet

(51) Int. Cl.
*G01J 3/28* (2006.01)
*G01J 3/42* (2006.01)
*G01N 21/31* (2006.01)

(52) U.S. Cl.
CPC ...... *G01N 21/31* (2013.01); *G01J 2003/2806* (2013.01); *G01J 2003/425* (2013.01); *G01N 2201/0221* (2013.01); *G01N 2201/062* (2013.01)

(58) Field of Classification Search
CPC .. G01J 3/10; G01J 3/2803; G01J 3/42; G01N 21/31; G01N 21/35; G01N 2201/0221; G01N 2201/062
See application file for complete search history.

(56) References Cited

U.S. PATENT DOCUMENTS

| | | | |
|---|---|---|---|
| 2018/0145205 A1 | 5/2018 | Chen et al. | |
| 2019/0063989 A1* | 2/2019 | Asauchi | G01J 3/0262 |
| 2019/0336062 A1 | 11/2019 | Choi et al. | |
| 2021/0003448 A1* | 1/2021 | Siess | G01J 3/0297 |

\* cited by examiner

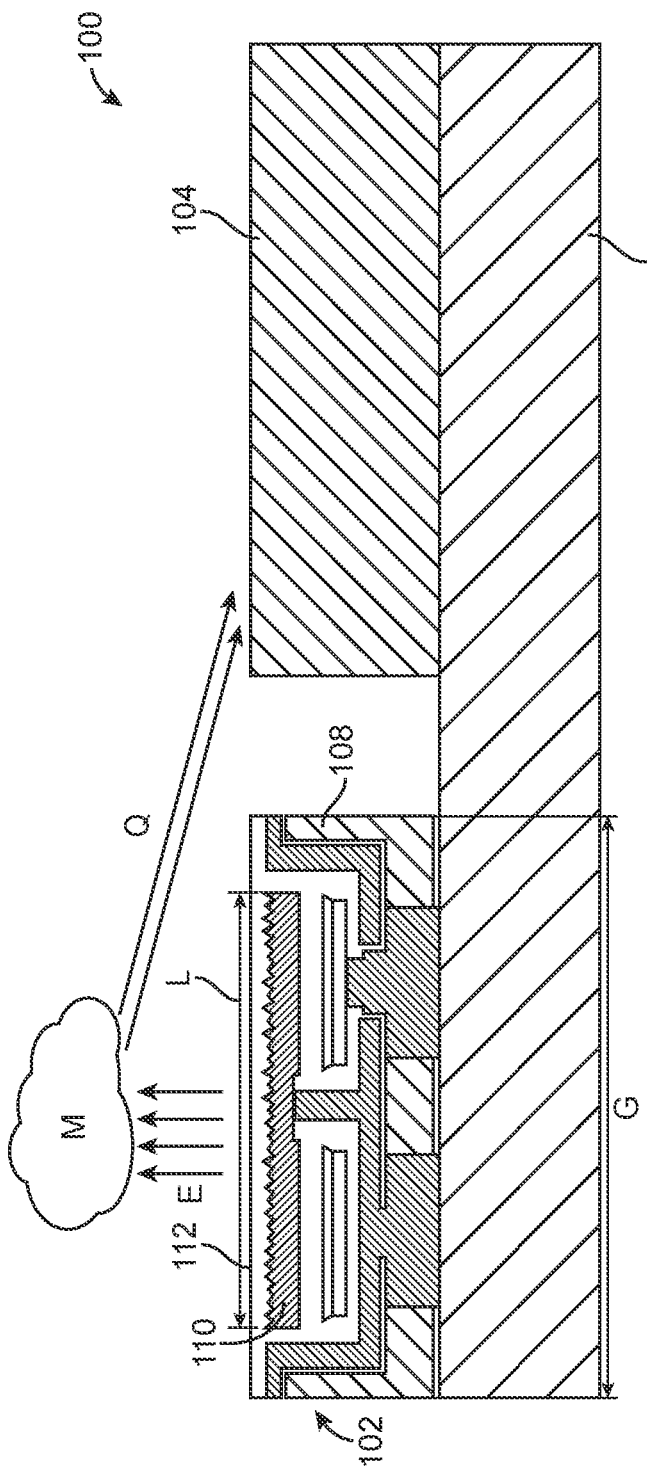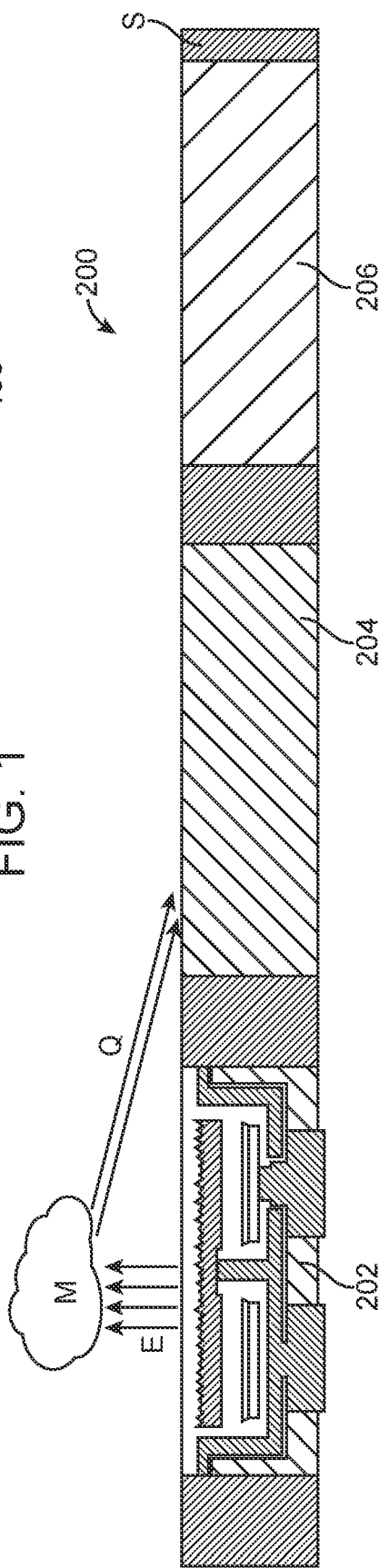

COMPACT MULTI-BAND OPTICAL MEASURING UNIT

This patent application is a national phase filing under section 371 of PCT/EP2019/075040, filed Sep. 18, 2019, which claims the priority of German patent application 10 2018 123 037.0, filed Sep. 19, 2018, each of which is incorporated herein by reference in its entirety.

TECHNICAL FIELD

The present invention relates to a measuring unit for optically measuring at least one property of a measured object.

BACKGROUND

Such a measuring unit is known from International Application Publication No. WO 2017/060746 A1. It is used to measure the blood glucose level of a patient. For this purpose, it comprises a blue LED, an infrared or IR LED, a photodiode and a processor.

The disadvantage of this measuring unit is that the space required to integrate it into a watch, a cell phone, clothing or a so-called "wearable" is still relatively large.

In addition, this measuring unit is only suitable for measuring blood glucose levels.

SUMMARY

Embodiments provide a measuring unit that has the smallest possible size and is versatile in use.

According to embodiments a measurement uninit includes a) a light emitting LED component comprising: (i) a housing, the housing occupying a housing surface; and (ii) an LED chip located within the housing, the LED chip comprising a light emitting light surface; b) a photodetector for detecting light reflected from the measured object and originating from the LED component and for outputting a measurement signal dependent on the detection; and c) an integrated circuit for evaluating the measurement signal supplied by the photodetector, wherein the LED component, the photodetector and the integrated circuit are combined into one integrated unit, and wherein a conversion layer is arranged in the housing and located above the LED chip, wherein the conversion layer converts the light emitted by the LED chip into multiband light, and wherein the ratio L/G of the light surface L to the housing surface G is greater than or equal to 0.8.

Due to the multiband conversion layer, the LED component emits multiband light. When this multiband light is reflected by the measuring object, an entire reflection spectrum is obtained, which can be detected by the photodetector and evaluated by the integrated circuit. The measuring unit according to embodiments is thus suitable for spectroscopy. Much more information about the measured object can be obtained via this spectral analysis than is possible with a monochromatic LED.

Thanks to the small housing size (the housing is hardly larger than the LED chip), the LED component is very compact, so that the measuring unit can be miniaturized accordingly.

By using a conversion layer to generate the multiband light, a single LED is sufficient as a light source. This eliminates the need for space-consuming installation of several separate LEDs.

Preferably, the LED chip can be configured to emit blue light. Blue light is more energetic than other light colors and therefore best suited for conversion to multiband light.

In one embodiment, the LED component and the photodetector can be arranged on the integrated circuit. This makes the measuring unit particularly compact and space-saving. The distance between the transmitter (LED component) and the photodetector is then minimized. In this case, the LED component and the photodetector are preferably arranged next to each other on the integrated circuit.

Alternatively, the measuring unit may further comprise a substrate, and the LED component, the photodetector and the integrated circuit are combined into an integrated unit via the substrate. In this way, too, a compact arrangement is obtained, which is also very stable due to the substrate. Preferably, the LED component, the photodetector and the integrated circuit are then arranged next to each other, with the photodetector preferably being arranged between the LED component and the integrated circuit. Thus, the photodetector is located near both the LED component and the integrated circuit, which facilitates the connection of the photodetector to the other two components. The LED component, photodetector, and integrated circuit can be embedded in the substrate. This increases the stability of the measuring unit and saves space. The arrangement is particularly space-saving if the LED component, the photodetector and/or the integrated circuit are flush with the substrate. Preferably, the substrate is made of an epoxy resin-based composition. Such a composition is inexpensive, with good stability and easy manufacturability of the substrate consisting of it.

It is advantageous if the conversion layer covers the entire light surface L. This ensures complete conversion of the light emitted by the LED chip. In particular, no unconverted light emitted by the LED chip can then escape from the LED component in an undesirable manner.

The measuring unit according to embodiments can serve as a spectrometer, with:
  the LED component as a light source of the spectrometer,
  the photodetector as radiation detector of the spectrometer, which outputs a reflection spectrum of the measuring object as a measurement signal, and
  the integrated circuit as an evaluation unit for the reflection spectrum output by the photodetector.

The result is a spectrometer that is extremely compact, and yet allows complex analysis of a measuring object. In addition, the spectrometer uses a single light source, which nevertheless covers a broad light spectrum.

This makes it possible to integrate the measuring unit into a cell phone, a wristwatch, another portable device or an article of clothing, or into a so-called "wearable".

Definitions

Several technical terms are used in the present application, which are defined in more detail below:

A) Multiband Light

Multiband light is light that has a spectrum that has several separate spectral lines. In contrast, monochromatic light has a spectrum with only a single spectral line. Multiband light differs from broadband light in that broadband light has a continuous spectrum, similar to a blackbody. Multiband light has at least two separate spectral lines. Multiband light can also have three or more separate spectral lines.

B) Chip Scale Package

Chip Scale Package (CSP) means a housing of an integrated electronic component whose size is comparable to the size of the chip housed in the housing. In the present application, a CSP package is said to be a CSP package if the ratio C/G of the chip surface C to the housing surface G is greater than or equal to 0.8: C/G≥0.8. If the chip is an LED chip, the light emitting light surface L of the LED chip may also be used as a comparative quantity instead of the chip surface C. Then an LED component is said to be a CSP component if L/G 0.8.

BRIEF DESCRIPTION OF THE DRAWINGS

Preferred embodiments of the invention are now described with reference to the drawings.

FIG. 1 shows a first variant of a measuring unit according to embodiments; and

FIG. 2 shows a second variant of a measuring unit according to embodiments.

DETAILED DESCRIPTION OF ILLUSTRATIVE EMBODIMENTS

In the following description, exemplary embodiments of the present invention are described with reference to the drawings. The drawings are not necessarily to scale, but are merely intended to illustrate the respective features schematically.

It should be noted that the features and components described below may each be combined with one another, regardless of whether they have been described in connection with a single embodiment. The combination of features in the respective embodiments serves only to illustrate the basic structure and functionality of the claimed device.

The measuring units 100, 200 shown in the two figures are used for optical measurement of at least one property of a measuring object M. The measuring object M may be different objects. The measured object M may be, for example, a food or human skin or a metal or another substance. By using the measuring unit 100, 200, a user can obtain information about the properties of the measured object M. For example, if the object is a food, the user can obtain information about its ingredients by means of the measuring unit. If the object is a substance, information about its composition can be obtained by means of the measuring unit 100, 200.

The measuring unit 100, 200 obtains information about the measured object M by emitting light E onto the measured object M, detecting the light Q reflected back from the measured object, and drawing conclusions about the properties of the measured object M based on the composition of the light.

The measuring unit 100, 200 is a microelectronic assembly. It is intended to be installed as part of an electronic device. The measuring unit 100, 200 is usually no larger than a fingernail.

With reference to FIG. 1, a first variant 100 of a measuring unit according to embodiments is now described.

The measuring unit 100 includes a light emitting LED component 102, a photodetector 104, and an integrated circuit 106.

In the present example, the LED component 102 and the photodetector 104 are arranged side-by-side on the integrated circuit. Thus, both the LED component 102 and the photodetector 104 have their bottom surfaces seated on the integrated circuit 106. More specifically, the LED component 102 and the photodetector 104 are attached to the integrated circuit 106. They may be glued there, for example. The structure according to FIG. 1 may also be referred to as "chip on IC".

Accordingly, the LED component 102, the photodetector 104, and the integrated circuit 106 are combined into an integrated unit.

The light emitting LED component 102 includes a housing 108 and an LED chip 110 disposed within the housing. The housing 108 occupies a bottom surface G. The LED chip 110 comprises a light-emitting light surface L. According to embodiments, the ratio L/G of the light surface L to the housing surface G is greater than or equal to 0.8. Thus, the LED component 102 is a so-called chip-scale package or CSP component. This means that the housing 108 of the LED component 102 is only slightly larger than the LED chip 110.

Preferably, the LED chip no comprises a blue LED. That is, the LED chip no is adapted to emit blue light.

The LED component 102 also comprises a light conversion layer 112 disposed in the housing and located above the LED chip no. Here, the conversion layer 112 covers the entire light surface L of the LED chip no. As a result, all of the blue light emitted from the LED chip no is converted. The conversion layer 112 is selected such that it converts the blue light emitted from the LED chip no into multiband light. Preferably, the conversion layer 112 converts the blue light into multiband infrared light. For example, the obtained infrared light may have three spectral lines. Preferably, the infrared light then comprises three infrared components: a first component in the near infrared range, a second component in the mid infrared range, and a third component in the far infrared range.

The photodetector 104 is used to detect light Q reflected back from the measured object M. This light Q originates from the LED component 102.

The photodetector 104 may output to the integrated circuit 106 a measurement signal that is dependent on characteristics of the reflected light Q. The photodetector 104 is adapted to perform spectral decomposition of the reflected light Q. The photodetector 104 may be realized as a set of photodiodes, photomultipliers, or phototransistors.

The integrated circuit 106 is used to evaluate the measurement signal supplied by the photodetector. The integrated circuit 106 can operate in analog or digital mode.

With reference to FIG. 2, a second variant 200 of a measuring unit according to embodiments is now described. The measuring unit 200 also has an LED component 202, a photodetector 204 and an integrated circuit 206. It differs from the first variant 100 according to FIG. 1 only in the way in which the three components 202, 204 and 206 are arranged relative to one another. In the second variant 200, the different arrangement results from a provided substrate S. The LED component 202, the photodetector 204 and the integrated circuit 206 are combined via the substrate S to form an integrated unit. In this regard, the LED component 202, the photodetector 204, and the integrated circuit 206 are arranged adjacent to each other. The photodetector 204 sits between the LED component 202 and the integrated circuit 206. The three components 202, 204, and 206 are embedded in the substrate S. In the example shown, the LED component 202, the photodetector 204, and the integrated circuit 206 are flush with the substrate S.

Preferably, the substrate S consists of an epoxy resin-based composition.

The measuring units 100, 200 according to embodiments can be used in particular as spectrometers in a cell phone, in a wristwatch or in any other portable device.

The operation is then as follows:

We assume that the measuring unit 100, 200 is integrated in a cell phone. A user of the cell phone can then activate the measuring unit 100, 200 and point it at an object M to be measured.

The LED chip no then emits blue light, which is converted into multiband light E by the conversion layer 112. This multiband light E then exits the LED component 102, 202 toward the measured object M. From there, it is reflected back toward the photodetector 104, 204. The photodetector 104, 204 detects the reflection spectrum Q. This is then evaluated by the integrated circuit 106, 206. Depending on the type of spectrum, conclusions can be drawn about properties of the measured object M.

Since the LED component 102 emits multiband light, a more informative reflection spectrum is also obtained from the measured object M. Such a reflection spectrum distributed over an entire wavelength range holds significantly more information about the measured object M than a reflection signal obtained via a monochromatic light source.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A measuring unit comprising:
   a light emitting LED component comprising:
   a housing occupying a housing surface G; and
   an LED chip located within the housing, the LED chip comprising a light emitting light surface L and being configured to emit light;
   a photodetector configured to:
   detect reflected light reflected from a measured object originating from the LED component; and
   output a measurement signal dependent on a detection of the reflected light; and
   an integrated circuit configured to evaluate the measurement signal,
   wherein the LED component, the photodetector, and the integrated circuit are combined into an integrated unit; and
   a conversion layer disposed in the housing and located above the LED chip, the conversion layer configured to convert the light into multiband light,
   wherein a ratio L/G of is greater than or equal to 0.8, and
   wherein the measuring unit is configured to optically measure at least one property of the measured object.

2. The measuring unit according to claim 1, wherein the LED chip is configured to emit blue light.

3. The measuring unit according to claim 1, wherein the LED component and the photodetector are arranged on the integrated circuit.

4. The measuring unit according to claim 3, wherein the LED component and the photodetector are arranged side-by-side on the integrated circuit.

5. The measuring unit according to claim 1, wherein the measuring unit further comprises a substrate, and wherein the LED component, the photodetector, and the integrated circuit are combined into the integrated unit via the substrate.

6. The measuring unit according to claim 5, wherein the LED component, the photodetector, and the integrated circuit are arranged adjacent to each other, and wherein the photodetector is arranged between the LED component and the integrated circuit.

7. The measuring unit according to claim 5, wherein the LED component, the photodetector and the integrated circuit are embedded in the substrate.

8. The measuring unit according to claim 7, wherein the LED component, the photodetector and/or the integrated circuit are flush with the substrate.

9. The measuring unit according to claim 5, wherein the substrate consists essentially of an epoxy resin-based composition.

10. The measuring unit according to claim 1, wherein the conversion layer covers the entire light surface L.

11. The measuring unit according to claim 1,
    wherein the measuring unit is a spectrometer,
    wherein the LED component is a light source of the spectrometer,
    wherein the photodetector is a radiation detector of the spectrometer,
    wherein the photodetector is configured to output a reflection spectrum of the measured object as the measurement signal, and
    wherein the integrated circuit is an evaluation unit for the reflection spectrum outputted from the photodetector.

12. A portable device comprising:
    the measuring unit according to claim 1.

* * * * *